A. J. ROSS.
GATE.
APPLICATION FILED JAN. 17, 1914.
1,132,389. Patented Mar. 16, 1915.
Fig. 1.
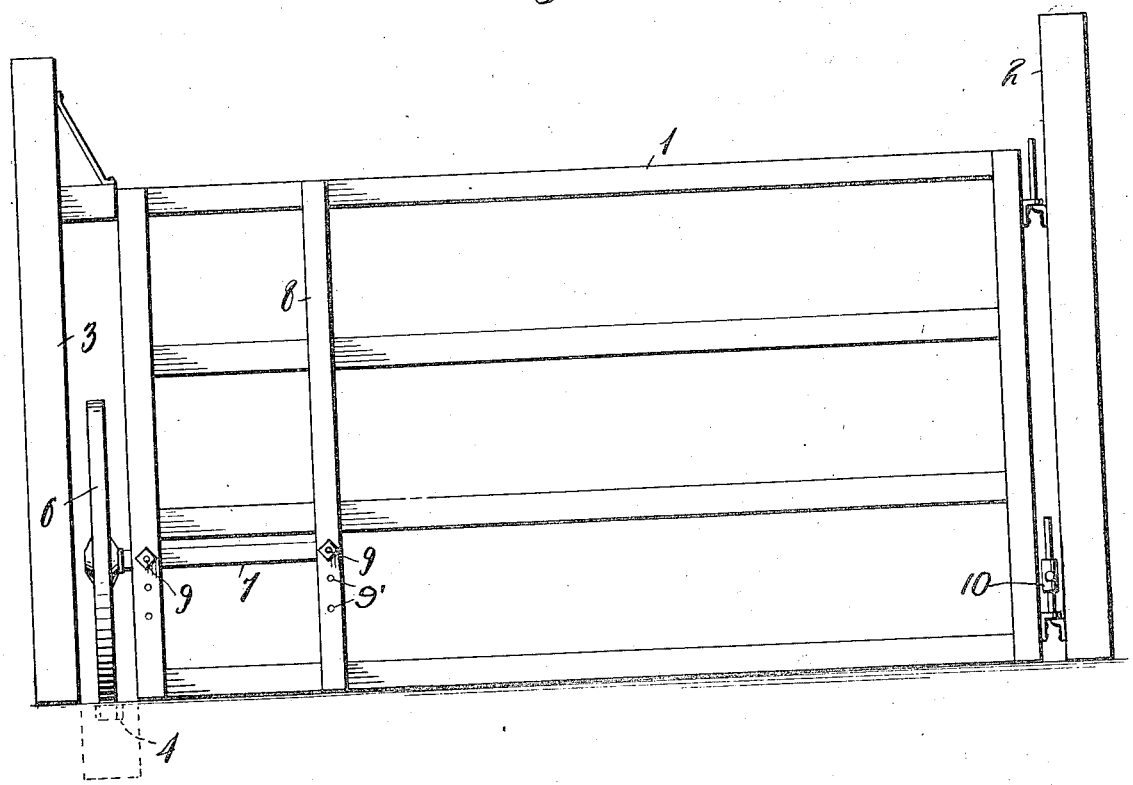
Fig. 2.
Fig. 3.
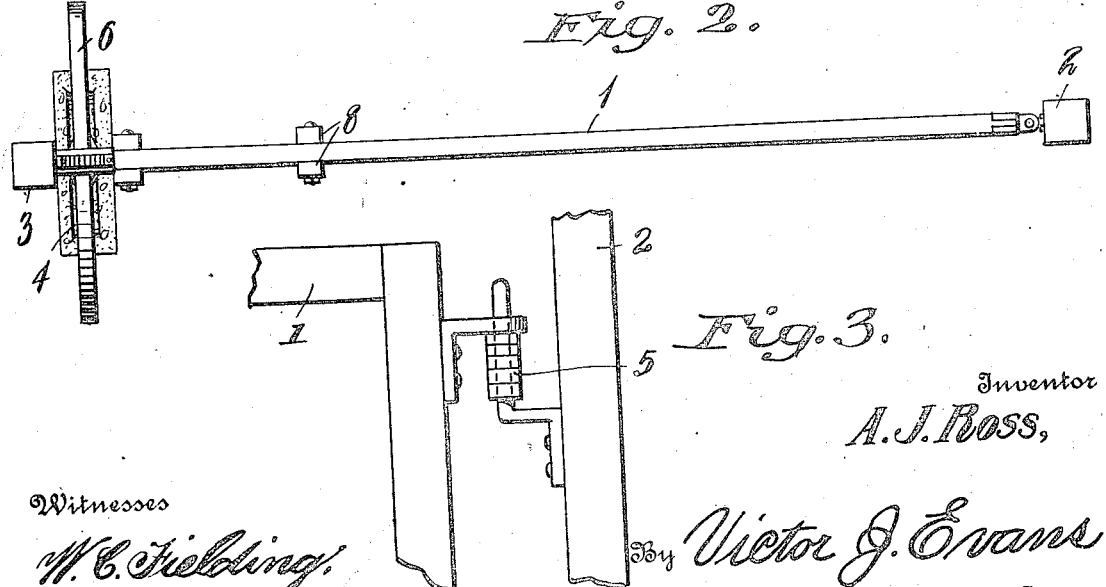
Witnesses
W. C. Fielding,
V. B. Hillyard.
Inventor
A. J. Ross,
By Victor J. Evans
Attorney

UNITED STATES PATENT OFFICE.

ABRAHAM J. ROSS, OF SPRINGFIELD, OHIO.

GATE.

1,132,389.   Specification of Letters Patent.   Patented Mar. 16, 1915.

Application filed January 17, 1914. Serial No. 812,776.

*To all whom it may concern:*

Be it known that I, ABRAHAM J. ROSS, a citizen of the United States, residing at Springfield, in the county of Clark and State of Ohio, have invented new and useful Improvements in Gates, of which the following is a specification.

The invention relates to farm gates and has for its object to relieve the strain upon the hinges, to maintain a close fit between the lower edge of the gate and the surface, to support the gate throughout its length when swinging the same open or shut and to hold the gate closed without requiring the usual latch mechanism, the construction being such as to admit of the gate swinging open in either direction.

The invention consists of a rolling support located at the outer or swinging end of the gate, a depression for the rolling support to drop into to hold the gate in position when closed, an axle for the rolling support adjustable vertically upon the gate to allow for variation and settlements so that the gate may be properly supported at its swinging end and means for hinging the gate to the supporting post so as to allow for proper adjustment of the gate without requiring the total unhinging of the gate when placing washers in position or removing them from the pintle member of the upper hinge.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a front view of a gate embodying the invention. Fig. 2 is a top plan view. Fig. 3 is an enlarged view of the upper hinge and portions of the gate and post.

Corresponding and like parts are referred to in the following description and indicated in all the views of the drawing, by the same reference characters.

The numeral 1 designates a gate which may be of any construction such as commonly provided for closing an opening in a fence or inclosure.

The numeral 2 designates the post to which the gate is hinged and 3 represents the post corresponding to the ordinary latch post. A depression 4 is formed in the surface adjacent the post 3 and in line with the posts 2 and 3 so as to receive the rolling support when the gate is closed. The gate is hinged to the post 2 in any manner to admit of the gate having a limited vertical movement. As shown the upper and lower hinges each comprise an eye member and a pintle member, the eye member being secured to the gate and the pintle member to the post 2. The lower pintle member is considerably longer than the upper pintle member to admit of the gate being elevated to enable the eye member of the upper hinge to clear the pintle member while the eye member of the lower hinge remains in engagement with its pintle member. This construction enables one or more washers 5 to be fitted to the pintle member of the upper hinge when adjusting the gate to meet existing conditions.

Under ordinary conditions the gate is adjusted so that when closed its lower edge rests upon the surface thereby relieving the rolling support and the hinges of a major part of the weight and strain. When the surface is covered with ice or snow it is necessary to elevate the gate and at the same time to lower the rolling support. The gate may be elevated by placing one or more washers 5 on the pintle of the upper hinge, the lower hinge serving to hold the gate in place. A stop 10 is secured to the pintle member of the lower hinge to limit the upward movement of the gate and prevent its unhinging. The stop 10 consists of a sleeve having a set screw by means of which it is secured in an adjusted position.

The rolling support 6 consists of a wheel of any size, design or construction which is mounted upon an axle 7 which is secured to the gate in a manner to admit of the rolling support being raised or lowered to meet varying conditions. One or more strips 8 are attached to the swinging end of the gate 1 and the axle 7 is attached thereto in the adjusted position by suitable fastenings 9. The strips 8 are provided with a series of vertically disposed apertures 9' and the apertures of one strip aline with the apertures of the other strip for receiving the fastening means 9 and by such arrangement admits of the axle being vertically adjusted to adapt the rolling support to the conditions to be met. The rolling support and the end of the gate clear the posts 3 thereby admitting of the gate being swung open in either direction. When the gate is closed the rolling support 6 drops into the depression 4 and the weight of the gate holds the rolling support in such depression and as a result the gate is held closed. To open the gate sufficient force must be exerted to cause the rolling support to ride out of the depression 4 and for this purpose the bottom of such depression is made sloping in each direction. When the gate is closed its lower edge rests upon the surface thereby relieving the rolling support and the hinges of excessive strain. As the gate is pushed open it is at the same time elevated by reason of the rolling support riding out of the depression 4 and after the rolling support clears such depression the gate moves easily and without any unusual strain upon the hinges and as a result frequent adjustment of the parts is not required as is necessary with the gate hinged in the ordinary way.

From the foregoing description, taken in connection with the accompanying drawing, the advantages of the construction and of the method of operation will be readily apparent to those skilled in the art to which the invention appertains, and while I have described the principle of operation of the invention together with the device which I now consider to be the best embodiment thereof, I desire to have it understood that the device shown is merely illustrative and that such changes may be made when desired as are within the scope of the claim appended hereto.

Having thus described the invention what is claimed as new is:—

A device of the class described including a gate having inner and outer vertically disposed members, each provided with a series of vertically alined apertures, an axle arranged between and transversely of said members and having one of its ends projecting beyond the longitudinal edge of the said outer member, a rolling support mounted on the extended portion of the axle, a member having a depression disposed beneath the tread of the rolling support for receiving said support, and means passing through the apertures of the inner and outer members and through said axle for permitting a vertical adjustment of the rolling support in a direction toward or away from the last named member thereby controlling the locking of said gate.

In testimony whereof I affix my signature in presence of two witnesses.

ABRAHAM J. ROSS.

Witnesses:
DAVID H. ZIEGLER,
BROWN BURLEIGH.